United States Patent
Job et al.

(10) Patent No.: US 12,425,884 B2
(45) Date of Patent: Sep. 23, 2025

(54) SYSTEM AND METHOD FOR CROSS-LAYER OPTIMIZATION OF UPLINK DETECTION THRESHOLDS

(71) Applicant: Samsung Electronics Co., Ltd., Suwon-si (KR)

(72) Inventors: Allen Job, Bangalore (IN); Vikash Kumar, Bangalore (IN); Dheeraj Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 18/328,108

(22) Filed: Jun. 2, 2023

(65) Prior Publication Data
US 2024/0114358 A1 Apr. 4, 2024

Related U.S. Application Data

(63) Continuation of application No. PCT/KR2023/006404, filed on May 11, 2023.

(30) Foreign Application Priority Data

Sep. 28, 2022 (IN) .............................. 202241055769

(51) Int. Cl.
*H04W 24/02* (2009.01)
*G06N 5/01* (2023.01)
(Continued)

(52) U.S. Cl.
CPC ............. *H04W 24/02* (2013.01); *H04L 43/16* (2013.01); *G06N 5/01* (2023.01); *H04B 17/309* (2015.01)

(58) Field of Classification Search
CPC ..... H04W 24/02; H04W 72/23; H04W 24/08; H04L 43/16; G06N 5/01; H04B 17/309
See application file for complete search history.

(56) References Cited

U.S. PATENT DOCUMENTS 9,814,073 B2 11/2017 Barbieri et al.
9,819,441 B2 11/2017 Immendorf et al.
(Continued)

FOREIGN PATENT DOCUMENTS

CN 102238580 A * 11/2011
CN 103796323 A 5/2014
(Continued)

OTHER PUBLICATIONS

3GPP TS 36.104 V17.6.0 (Jun. 2022) Technical Specification Group Radio Access Network; Evolved Universal Terrestrial Radio Access (E-UTRA); Base Station (BS) radio transmission and reception (Release 17) (Year: 2022).*
(Continued)

*Primary Examiner* — Joseph E Avellino
*Assistant Examiner* — Lucia G Gradinariu
(74) *Attorney, Agent, or Firm* — Jefferson IP Law, LLP

(57) ABSTRACT

A method of detecting an uplink signal in a communication network is provided. The method includes setting a current detection threshold in an allowable range of uplink detection thresholds for detection of a plurality of uplink signals for a predetermined time period, identifying a plurality of candidate detection thresholds in a predetermined window centered around the current detection threshold at a first layer for detection of the plurality of uplink signals, identifying an optimal detection threshold among the plurality of candidate detection threshold based on identifying whether the plurality of uplink signals are detected correctly at a second layer, and applying the optimal detection threshold at the first layer as the current detection threshold for the detection of the plurality of uplink signals, wherein the first layer comprises a physical (PHY) layer, and wherein the second layer comprises a medium access control (MAC) layer.

16 Claims, 11 Drawing Sheets

(51) Int. Cl.
*H04B 17/309* (2015.01)
*H04L 43/16* (2022.01)

(56) References Cited

U.S. PATENT DOCUMENTS

| | | | | |
|---|---|---|---|---|
| 9,900,913 | B2 | 2/2018 | Lu | |
| 10,149,323 | B2* | 12/2018 | Ezaki | H04W 74/0838 |
| 10,701,733 | B2 | 6/2020 | You et al. | |
| 11,019,666 | B2 | 5/2021 | Zhang et al. | |
| 12,119,927 | B2* | 10/2024 | Kvernvik | G06N 3/006 |
| 2003/0128744 | A1* | 7/2003 | Yeo | H04L 1/201 |
| | | | | 375/147 |
| 2008/0037458 | A1* | 2/2008 | Myszne | H04L 1/0061 |
| | | | | 370/319 |
| 2013/0095774 | A1* | 4/2013 | Gulati | H04B 7/0417 |
| | | | | 455/78 |
| 2015/0215968 | A1 | 7/2015 | Jiang et al. | |
| 2016/0192394 | A1 | 6/2016 | Ezaki | |
| 2018/0007643 | A1* | 1/2018 | Tiirola | H04W 52/262 |
| 2018/0176753 | A1* | 6/2018 | Kim | H04W 72/23 |
| 2018/0368162 | A1 | 12/2018 | Ostergaard et al. | |
| 2021/0058822 | A1 | 2/2021 | Ly et al. | |
| 2021/0105829 | A1* | 4/2021 | Damnjanovic | H04W 24/08 |
| 2021/0345411 | A1 | 11/2021 | Li et al. | |
| 2022/0053563 | A1* | 2/2022 | Chande | H04B 17/336 |
| 2022/0070880 | A1 | 3/2022 | Loehr et al. | |

FOREIGN PATENT DOCUMENTS

| | | |
|---|---|---|
| CN | 112954748 A | 6/2021 |
| KR | 10-2019-0095918 A | 8/2019 |
| WO | 2021/227036 A1 | 11/2021 |
| WO | 2022/027586 A1 | 2/2022 |

OTHER PUBLICATIONS

ETSI EN 301 893 V2.1.1 (May 2017) "5 GHz RLAN; Harmonised Standard covering the essential requirements of article 3.2 of Directive 2014/53/EU" (Year: 2017).*

Setareh Maghsudi and Ekram Hossain Multi-Armed Bandits with Application to 5G Small Cells IEEE Wireless Communications â¢ Jun. 2016 (Year: 2016).*

Ur-Rehman et al., âIterative Cross-layer Decoder for WiMAX using Hybrid-ARQ,â 2012 IEEE 14th International Conference on High Performance Computing and Communications (Year: 2012).*

Realp et al., âMultipacket MAC for Multiple Antenna Systems: A Cross-Layer Approach,â 2004 IEEE Sensor. Array and Multichannel Signal Processing Workshop (Year: 2004).*

Hu et al, "A Method of PRACH Detection Threshold Setting in LTE TDD Femtocell System", Jan. 24, 2013.

International Search Report and Written Opinion, dated Aug. 30, 2023, issued in International Application No. PCT/KR2023/006404.

* cited by examiner

SYSTEM AND METHOD FOR CROSS-LAYER OPTIMIZATION OF UPLINK DETECTION THRESHOLDS

CROSS-REFERENCE TO RELATED APPLICATION(S)

This application is a continuation application, claiming priority under § 365 (c), of an International application No. PCT/KR2023/006404, filed on May 11, 2023, which is based on and claims the benefit of an Indian complete application Ser. No. 202241055769, filed on Sep. 28, 2022, in the Indian Intellectual Property Office, the disclosure of which is incorporated by reference herein in its entirety.

FIELD OF THE INVENTION

The disclosure relates to the field of wireless communication. More particularly, the disclosure relates to a method and system for cross-layer optimization of uplink detection thresholds in a wireless communication network.

BACKGROUND

In recent years, several broadband wireless technologies have been developed for providing better applications and services to meet the growing requirements of broadband subscribers. Second generation wireless communication system has been developed to provide voice services while ensuring the mobility of users. Third generation wireless communication systems support not only the voice service but also data service. In recent years, fourth generation wireless communication systems have been developed to provide high-speed data service. However, currently, the fourth-generation wireless communication systems suffer from a lack of resources to meet the growing demand for high-speed data services. This problem is solved by the deployment of fifth generation wireless communication systems to meet the ever-growing demand for high-speed data services. Furthermore, the fifth-generation wireless communication systems provide ultra-reliability and supports low latency applications.

A fifth generation wireless communication system may include a number of base stations for a plurality of user equipment's (UEs). A UE may communicate with a base station (BS) via downlink (DL) and uplink (UL). "Downlink" corresponds to a communication link from the BS side to the UE side, and "uplink" corresponds to a communication link from the UE side to the BS side.

During the communication between the UE and the BS via the uplink, detection thresholds for physical random access channel (PRACH) transmissions and scheduling requests (SR) are static. The detection thresholds do not adapt to the dynamic nature of the channel and environment. This results in the detection thresholds being sub-optimal. Sub-optimal detection thresholds may result in increased false detection/misdetection of PRACH and SR. This adds computational load to the medium access control (MAC) layer in gNodeB (base station) by scheduling random access response (RAR)/MSG3 (PRACH) and physical uplink shared channel (PUSCH) transmission (i.e., SR) and also results in the wastage of physical downlink control channel (PDCCH), physical downlink shared channel (PDSCH) and PUSCH resources.

Further, the optimality of the physical layer (PHY) L1 detection thresholds can be assessed by examining L2 response success as observed from the MAC layer (L2). A false detected signal may result in the failure of the response (PUSCH) at the MAC layer. Similarly, a signal judged as false detection may not succeed in getting a valid response at the MAC layer. If it succeeds, then there are missed detections in the system.

In particular, when the detection threshold is non-optimal and allows for more detection of uplink signals, a high number of false alarms is also allowed in the system. This results in PDCCH/PDSCH resource loss for sending the UL grant as well as PUSCH resource loss for the UL signal transmission. This also results in the reduction of the DL and UL TP performance. For hardware-constrained processing, the opportunity is sometimes lost for processing real signals and results in a slight reduction in PRACH/SR key performance indicator (KPI).

FIG. 1 is an example scenario where a non-optimal detection threshold is set for detection of UL signals at the PHY layer and the MAC layer, and detection of UL response for the grant at the MAC layer of the drawings, according to the related art.

Further, when the detection threshold is non optimal and allows for more missed detection, a significant number of real signals are lost. A false alarm may reduce a lot but at the steep price of reduced detection. This scenario is not ideal as it reduces the PRACH/SR reception KPI significantly.

FIG. 2 is an example scenario where a non-optimal detection threshold is set to allow for a greater number of missed detections, according to the related art.

Thus, false detections and missed detections of the PRACH and SR may cause unnecessary processing at the base station (gNodeB) and wastage of radio resources, and missed scheduling of response for real UE.

Therefore, there lies a need for a method and system that can mitigate the above-mentioned problems and provide an enhanced detection performance of PRACH and SR in a 5G communication network.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of optimizing uplink signal detection in a communication network. The method includes initializing a current detection threshold in an allowable range of uplink detection thresholds for detection of a plurality of uplink signals for a predetermined time period, and thereafter selecting and applying, based on one of a self-learning mechanism or at random, a detection threshold within a narrow window centered around the current detection threshold at the PHY layer for detection of the plurality of uplink signals. The method further includes determining whether a corresponding uplink signal among the plurality of uplink signals is detected correctly or falsely at a medium access control (MAC) layer based on one of the validity of detection parameters or a detection rate of a Physical Uplink Shared Channel (PUSCH) transmission during the predetermined time period. Subsequent to the determination, the method further includes accumulating, for the applied detection threshold, the corresponding results of the determination at the MAC layer for the predetermined time period and based on an analysis of the accumulated results further determining an optimal detection threshold from the narrow window centered around the current detection threshold. The method thereafter includes applying the determined optimal detection threshold at the PHY layer as the current detection threshold for the detection of the plurality of uplink signals.

Another aspect of the disclosure is to provide a system for optimizing uplink signal detection in a communication network that includes one or more processors. The one or more processors are configured to initialize a current detection threshold in an allowable range of uplink detection thresholds for detection of a plurality of uplink signals at a physical (PHY) layer for a predetermined time period, and select and apply, based on one of a self-learning mechanism or at random, a detection threshold within a narrow window centered around the current detection threshold at the PHY layer for detection of the plurality of uplink signals. The one or more processors are further configured to determine whether a corresponding uplink signal among the plurality of uplink signals is detected correctly or falsely at a medium access control (MAC) layer based on one of a validity of detection parameters or a detection rate of a physical uplink shared channel (PUSCH) transmission during the predetermined time period. Subsequent to the determination, the one or more processors are further configured to accumulate, for the applied detection threshold, the corresponding results of the determination at the MAC layer for the predetermined time period, and then determine, based on an analysis of the accumulated results, an optimal detection threshold from the narrow window centered around the current detection threshold. Thereafter, the one or more processors are further configured to apply the determined optimal detection threshold at the PHY layer as the current detection threshold for detection of the plurality of uplink signals.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawing, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
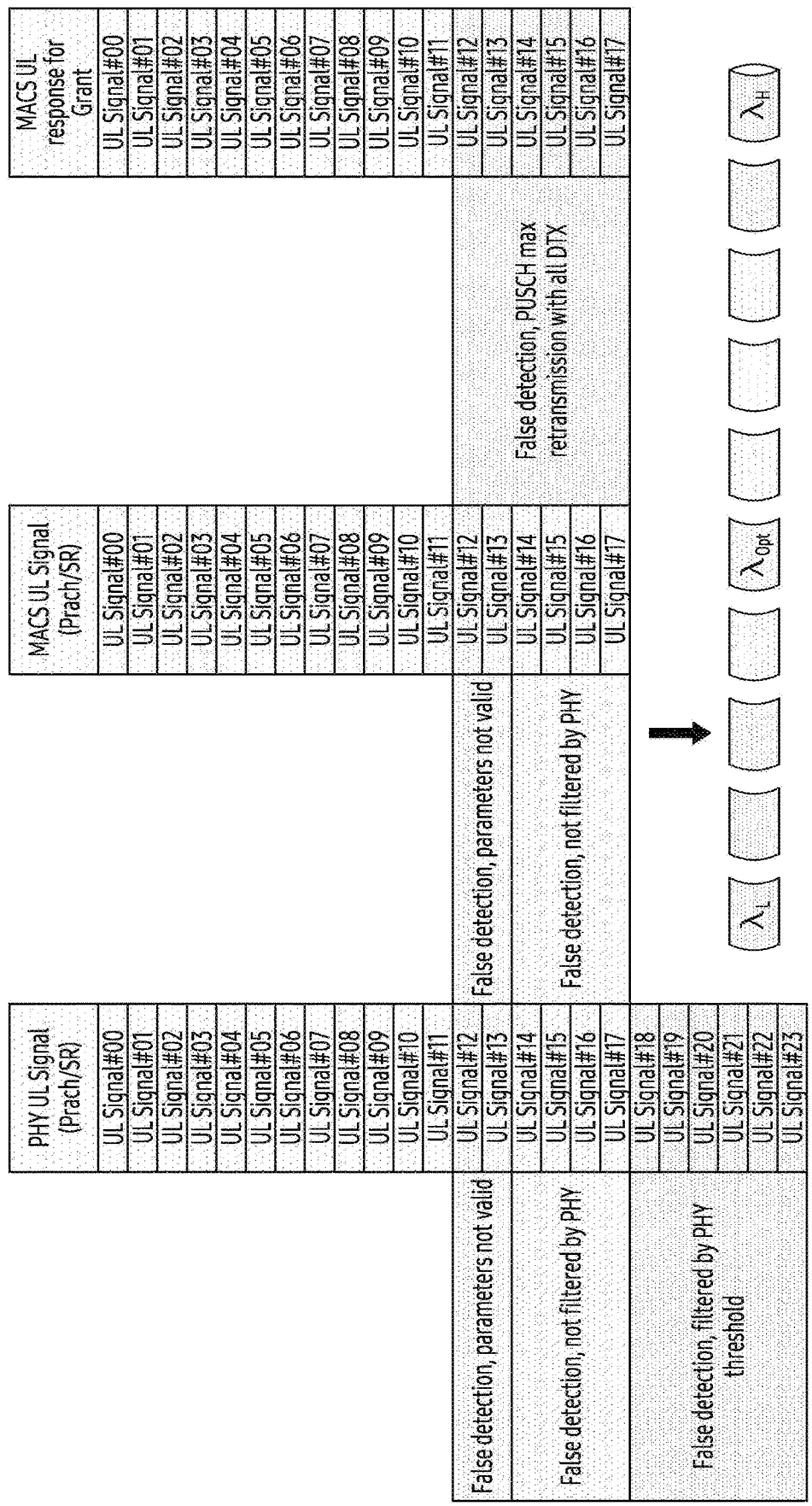
FIG. 1 illustrates an example scenario where a non-optimal detection threshold is set for detection of UL signals at the PHY layer and the MAC layer, and detection of UL response for the grant at the MAC layer, according to the related art.
Figure 2:
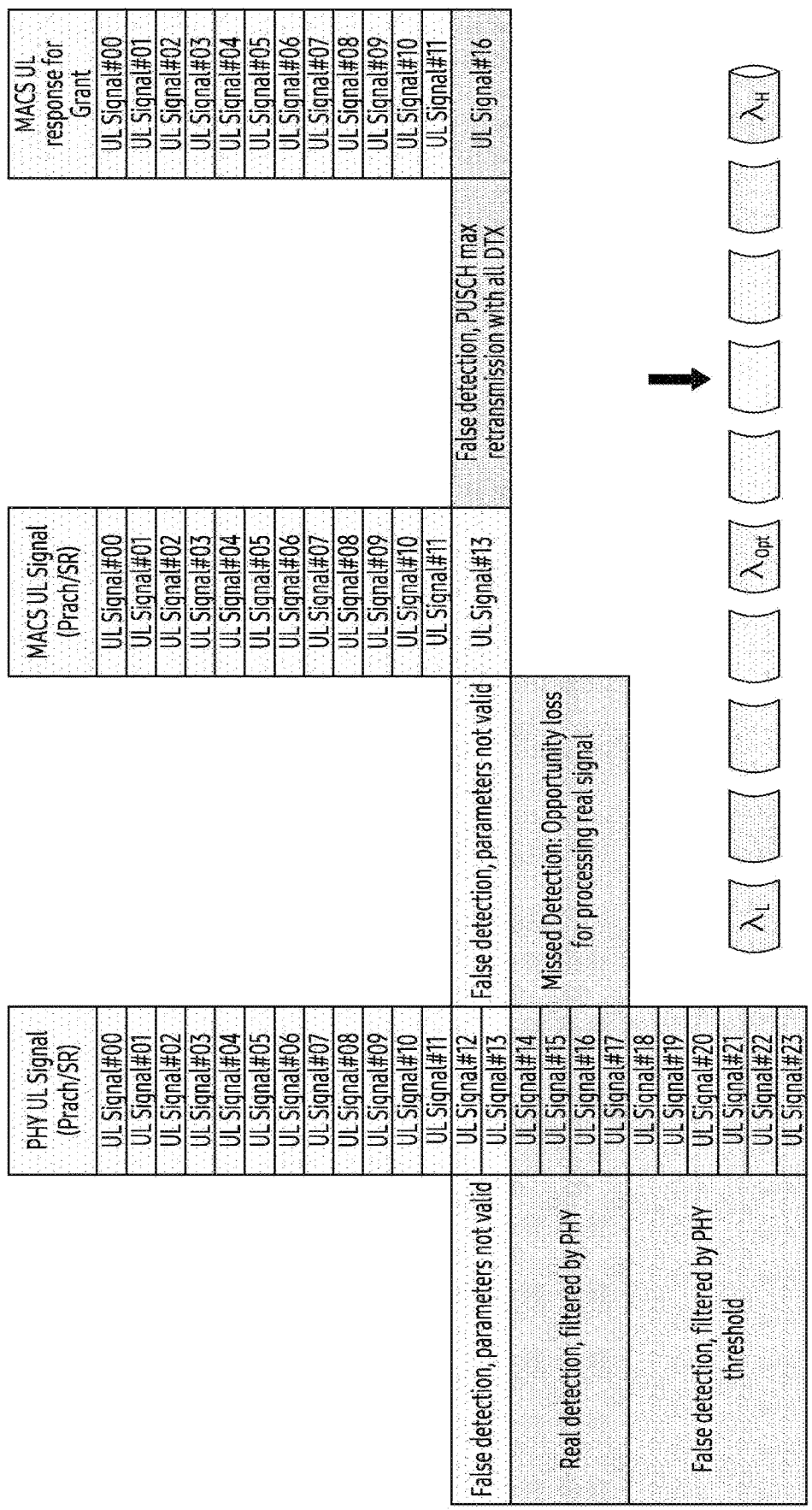
FIG. 2 illustrates an example scenario where a non-optimal detection threshold is set to allow for a greater number of missed detections, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not be limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various examples of the disclosure described below, a hardware approach will be described as an example. However, since various embodiments of the disclosure may include a technology that utilizes both the hardware-based and the software-based approaches, they are not intended to exclude the software-based approach.

As used herein, the terms referring to merging (e.g., merging, grouping, combination, aggregation, joint, integration, unifying), the terms referring to signals (e.g., packet, message, signal, information, signaling), the terms referring to resources (e.g. section, symbol, slot, subframe, radio frame, subcarrier, resource element (RE), resource block (RB), bandwidth part (BWP), opportunity), the terms used to refer to any operation state (e.g., step, operation, procedure), the terms referring to data (e.g. packet, message, user stream, information, bit, symbol, codeword), the terms referring to a channel, the terms referring to a network entity (e.g., distributed unit (DU), radio unit (RU), central unit (CU), control plane (CU-CP), user plane (CU-UP), O-DU-open radio access network (O-RAN) DU), O-RU (O-RAN RU), O-CU (O-RAN CU), O-CU-UP (O-RAN CU-CP), O-CU-CP (O-RAN CU—CP)), the terms referring to the components of an apparatus or device, or the like are only illustrated for convenience of description in the disclosure. Therefore, the disclosure is not limited to those terms described below, and other terms having the same or equivalent technical meaning may be used therefor. Further, as used herein, the terms, such as '~module', '~unit', '~part', '~body', or the like may refer to at least one shape of structure or a unit for processing a certain function.

Further, throughout the disclosure, an expression, such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression, such as 'above', a condition described as 'less than or equal to' may be replaced with an expression, such as 'below', and a condition described as 'more than or equal to and below' may be replaced with 'above and less than or equal to', respectively. Furthermore, hereinafter, 'A' to 'B' means at least one of the elements from A (including A) to B (including B). Hereinafter, 'C' and/or 'D' means including at least one of 'C' or 'D', that is, {'C', 'D', or 'C' and 'D'}.

The disclosure describes various embodiments using terms used in some communication standards (e.g., 3rd Generation Partnership Project (3GPP), extensible radio access network (xRAN), open-radio access network (O-RAN) or the like), but it is only of an example for explanation, and the various embodiments of the disclosure may be easily modified even in other communication systems and applied thereto.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "one, or more than one, or all." Accordingly, the terms "one," "more than one," "more than one, but not all" or "all" would all fall under the definition of "some." The term "some embodiments" may refer to one embodiment or to several embodiments or to all embodiments. Accordingly, the term "some embodiments" is defined as meaning "one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents.

More specifically, any terms used herein such as but not limited to "includes," "comprises," "has," "have" "consists," and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language "must comprise" or "needs to include."

Whether or not a certain feature or element was limited to being used only once, either way, it may still be referred to as "one or more features" "one or more elements" "at least one feature" or "at least one element." Furthermore, the use of the terms "one or more" or "at least one" feature or element does not preclude there being none of that feature or element unless otherwise specified by limiting language such as "there needs to be one or more" or "one or more element is required."

Unless otherwise defined, all terms, and especially any technical and/or scientific terms, used herein may be taken to have the same meaning as commonly understood by one having ordinary skill in the art.

Embodiments of the disclosure will be described below in detail with reference to the accompanying drawings.

Figure 3:
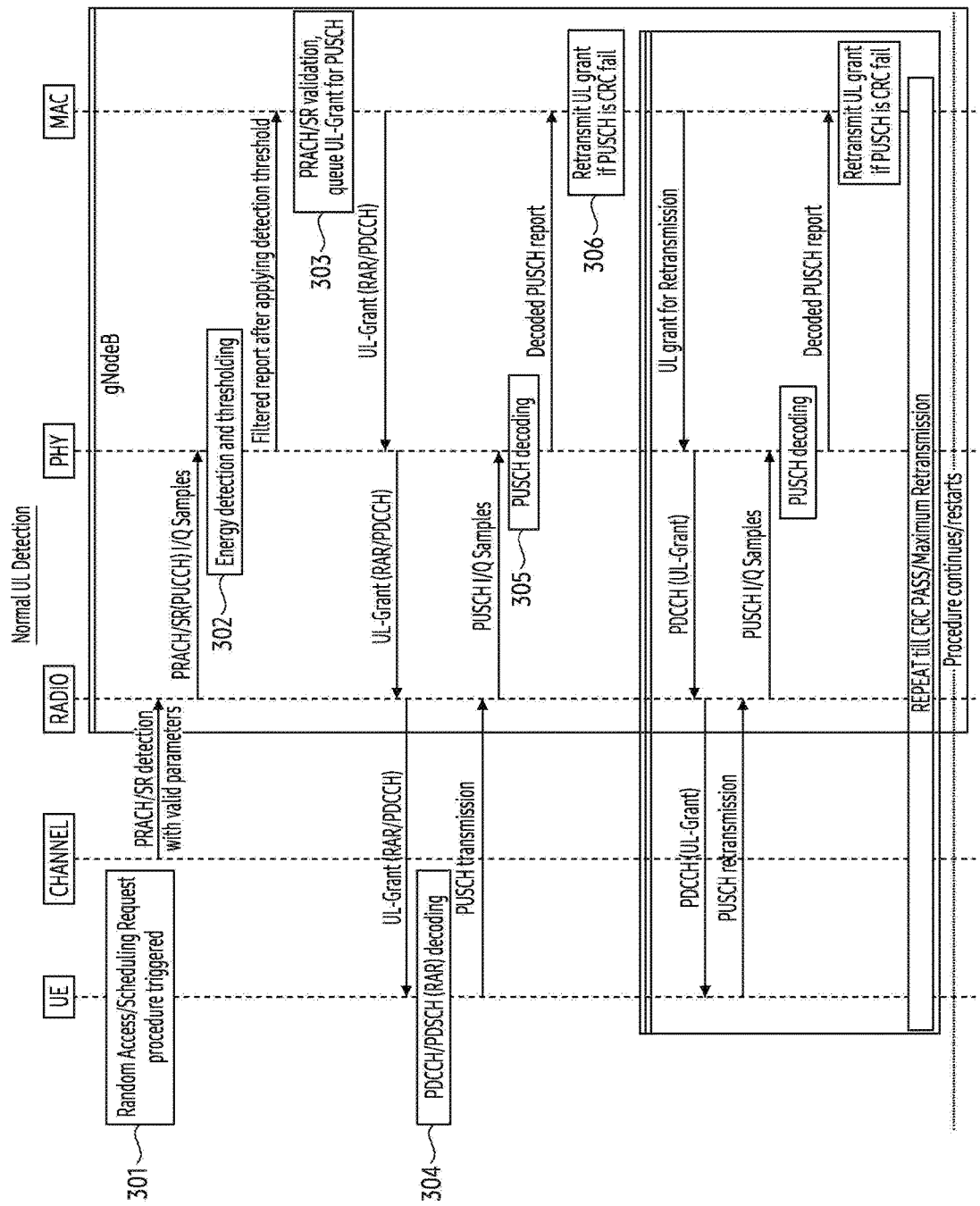
FIG. 3 illustrates an example line diagram depicting a normal UL signal detection procedure within a wireless communication network according to an embodiment of the disclosure.

FIG. 3 illustrates an example line diagram depicting a normal UL signal detection procedure within a wireless communication network according to an embodiment of the disclosure. Referring to FIG. 3, in the normal UL signal detection procedure, UE requests the base station (gNodeB) to send UL grant. If the base station sends the UL grant, then the UE can send UL data as allowed by the UL grant. The normal UL signal detection procedure includes a series of operations as depicted in FIG. 3. In operation 301 of FIG. 3, the UE sends or triggers a random access/SR (scheduling request) on PUCCH. In operation 302 of FIG. 3, the base station performs energy detection and thresholding at the PHY layer and transmits the filtered report to the MAC layer. In operation 303 of FIG. 3, the MAC layer of the gNodeB performs PRACH/SR validation, queue UL-grant for PUSCH, and sends UL grant on PDCCH to the UE. Further, in operation 304 of FIG. 3, the UE performs decoding for the whole PDCCH area (PDCCH search space) and checks if there is any DCI 0 information that has CRC value encoded with C_RNTI allocated to it, and transmits PUSCH based on the RBs specified by DCI 0. Further, in operation 305 of FIG. 3, the gNodeB performs decoding of the PUSCH at the PHY layer for the PUSCH report, and further in operation 306 of FIG. 3, the gNodeB performs a retransmission of the UL grant if it is determined that PUSCH is CRC fail. This process is repeated between the UE and the gNodeB till it is determined that the PUSCH is CRC pass.

Figure 4:
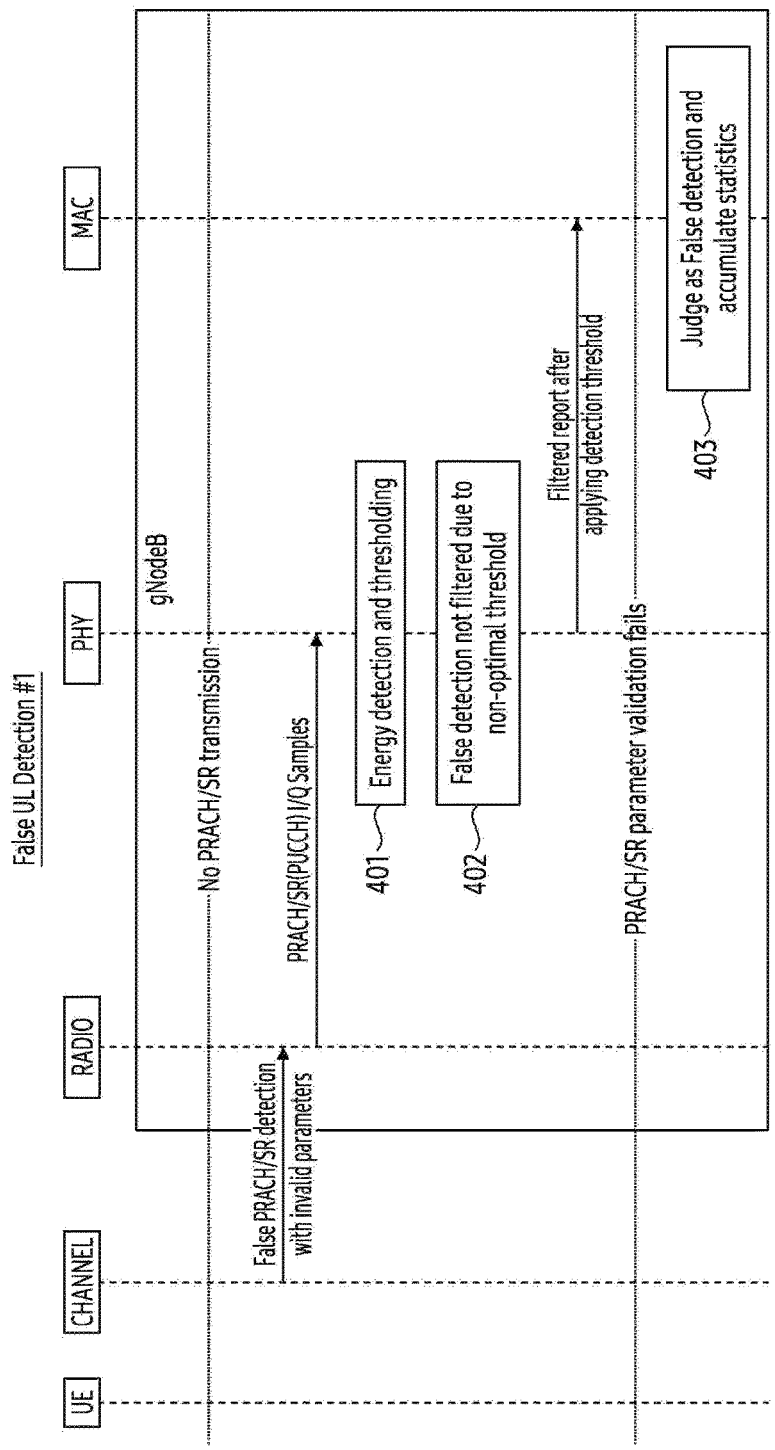
FIG. 4 illustrates a first example line diagram depicting a false UL signal detection procedure within the wireless communication network according to an embodiment of the disclosure.

FIG. 4 illustrates a first example line diagram depicting a false UL signal detection procedure within the wireless communication network according to an embodiment of the disclosure. Referring to FIG. 4, the false UL signal detection procedure includes a series of operations as depicted in FIG. 4. In the false UL signal detection procedure, there are no PRACH/SR transmission takes place. In operation 401 of FIG. 4, the gNodeB performs energy detection and thresholding at the PHY layer when it is determined that false PRACH/SR detection with invalid parameters is triggered at the channel. In operation 402 of FIG. 4, it is determined that false detection is not filtered due to a non-optimal threshold that is set for the UL signal detection. Due to the non-filtering of the false detection, the PRACH/SR parameter validation failed, and further in operation 403 of FIG. 4, the MAC layer of the gNodeB judges the UL signal detection as the false detection and accumulates results and statistics corresponding to each false detection.

Figure 5:
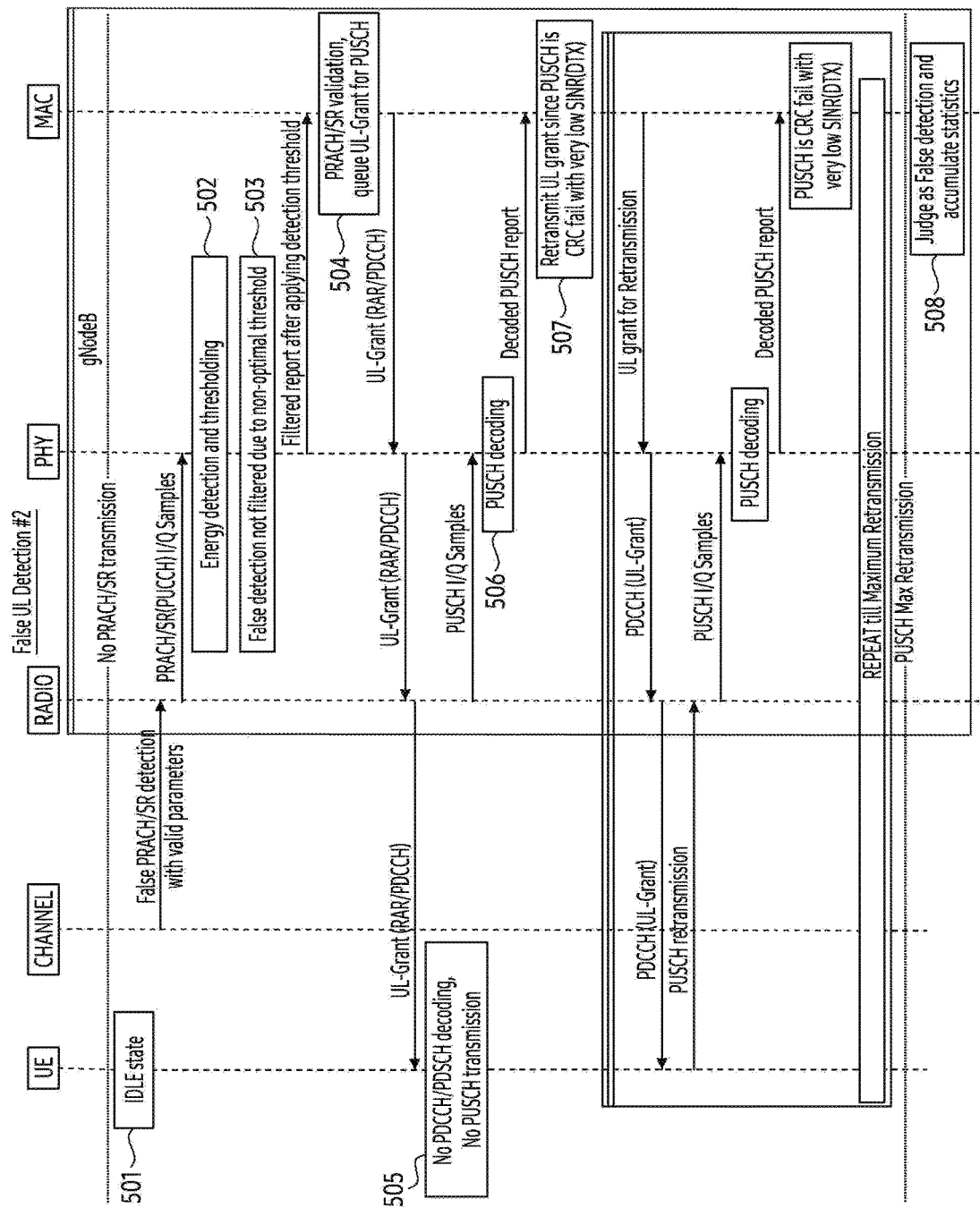
FIG. 5 illustrates a second example line diagram depicting another false UL signal detection procedure within the wireless communication network according to an embodiment of the disclosure.

FIG. 5 illustrates a second example line diagram depicting another false UL signal detection procedure within the wireless communication network according to an embodiment of the disclosure. Referring to FIG. 5, the false UL signal detection procedure includes a series of operations as depicted in FIG. 5. In the false UL signal detection procedure, the UE remains in an idle state (operation 501 of FIG. 5) and there are no PRACH/SR transmission takes place. In operation 502 of FIG. 5, the gNodeB performs energy detection and thresholding at the PHY layer when it is determined that false PRACH/SR detection with invalid parameters is triggered at the channel. In operation 503 of FIG. 5, it is determined that false detection is not filtered due to a non-optimal threshold that is set for the UL signal detection. Due to the non-filtering of the false detection, the PRACH/SR parameter validation failed, and further in operation 504 of FIG. 5, the MAC layer of the gNodeB performs PRACH/SR validation, queue UL-grant for PUSCH, and sends UL grant on PDCCH to the UE. However, in operation 505 of FIG. 5, since the UE is in an idle state, no PDCCH/PDSCH decoding is performed and no PUSCH transmission takes place. Further, in operation 506 of FIG. 5, the gNodeB performs decoding of the PUSCH at the PHY layer for the PUSCH report, and further in operation 507 of FIG. 5, the gNodeB performs a retransmission of the UL grant when it is determined that the PUSCH is CRC fail with very SINR (DTX). This process is repeated by the gNodeB till a maximum retransmission is reached. Further, once the maximum retransmission is reached, the MAC layer of the gNodeB judges the UL signal detection as the false detection and accumulates results and statistics corresponding to each of the false detection, in operation 508 of FIG. 5.

Figure 6:
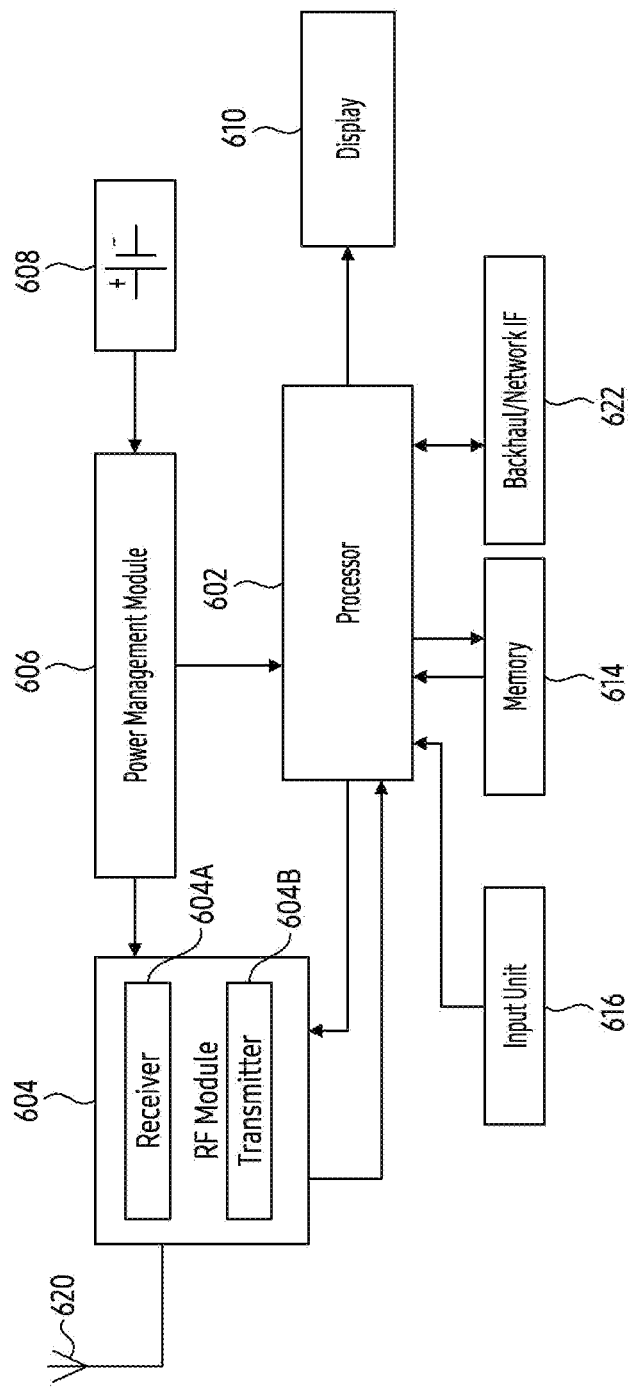
FIG. 6 is a block diagram of a wireless communication system, according to an embodiment of the disclosure.

FIG. 6 is a block diagram of a wireless communication system including a transmitter and a receiver, according to an embodiment of the disclosure. The wireless communication system as shown in FIG. 6 may correspond to the base station. The wireless communication system as shown in FIG. 6 is configured to perform the method operations illustrated in FIGS. 7 and 9, but it can be any system for performing the operations described below in the flow charts of FIGS. 7 and 9.

Referring to FIG. 6, based on an example implementation, the wireless communication system may include a processor 602 and an RF module (e.g., transceiver 604). The processor 602 is electrically connected with the transceiver 604 and controls the transceiver 604. The communication system may further include an antenna 620 connected to the RF module (e.g., transceiver 604), a power management module 606 coupled to a battery 608 and configured to provide power supply to the processor and other components of the system, a display 610, a memory device 614 configured to store a set of instruction to be executed by the processor 602, an input unit 616 configured to receive an input signal from the UE, and a Backhaul/Network IF 622.

The wireless communication system of FIG. 6 corresponds to the base station comprising a transmitter 604B configured to transmit a message to the UE and a receiver 604A configured to receive the transmission or reception timing information from the UE. The receiver 604A and the transmitter 604B constitute the transceiver 604, where the processor 602 is connected to the transceiver (604: receiver 604A and transmitter 604B).

Depending on the network type, the term "base station" can refer to any component (or collection of components) configured to provide wireless access to a network, such as an enhanced base station (eNodeB or gNB), a 5G base station (gNB), a WiFi access point (AP), or other wirelessly enabled devices. Base stations may provide wireless access in accordance with one or more wireless communication protocols, e.g., 5G 3GPP new radio interface/access (NR), long-term evolution (LTE), LTE Advanced (LTE-A), high-speed packet access (HSPA), Wi-Fi 802.11a/b/g/n/ac, etc. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in the disclosure to refer to remote wireless equipment that wirelessly accesses a BS.

The processor 602 can include one or more processors or other processing devices that control the overall operation of the base station. For example, the processor 602 could control the reception of forward channel signals and the transmission of reverse channel signals by the transceiver 604 in accordance with well-known principles. The processor 602 could support additional functions as well, such as more advanced wireless communication functions. For instance, the processor 602 could support beam forming or directional routing operations in which outgoing/incoming signals from/to multiple antennas are weighted differently to effectively steer the outgoing signals in a desired direction. Any of a wide variety of other functions could be supported in the base station by the processor 602.

The processor 602 is also coupled to the backhaul/network IF 622. The backhaul/network IF 622 allows the base station to communicate with other devices or systems over a backhaul connection or a network. The backhaul/network IF 622 could support communications over any suitable wired or wireless connection(s). For example, when the base station is implemented as part of a cellular communication system (e.g., one supporting 5G, LTE, or LTE-A), the backhaul/network IF 622 could allow the base station to communicate with other base stations (BSs) over a wired or wireless backhaul connection. The backhaul/network IF 622 may include any suitable structure supporting communications over a wired or wireless connection, such as an ethernet or an RF transceiver.

Now, a flow chart of method operations will be described with reference to FIG. 7 of the drawings.

Figure 7:
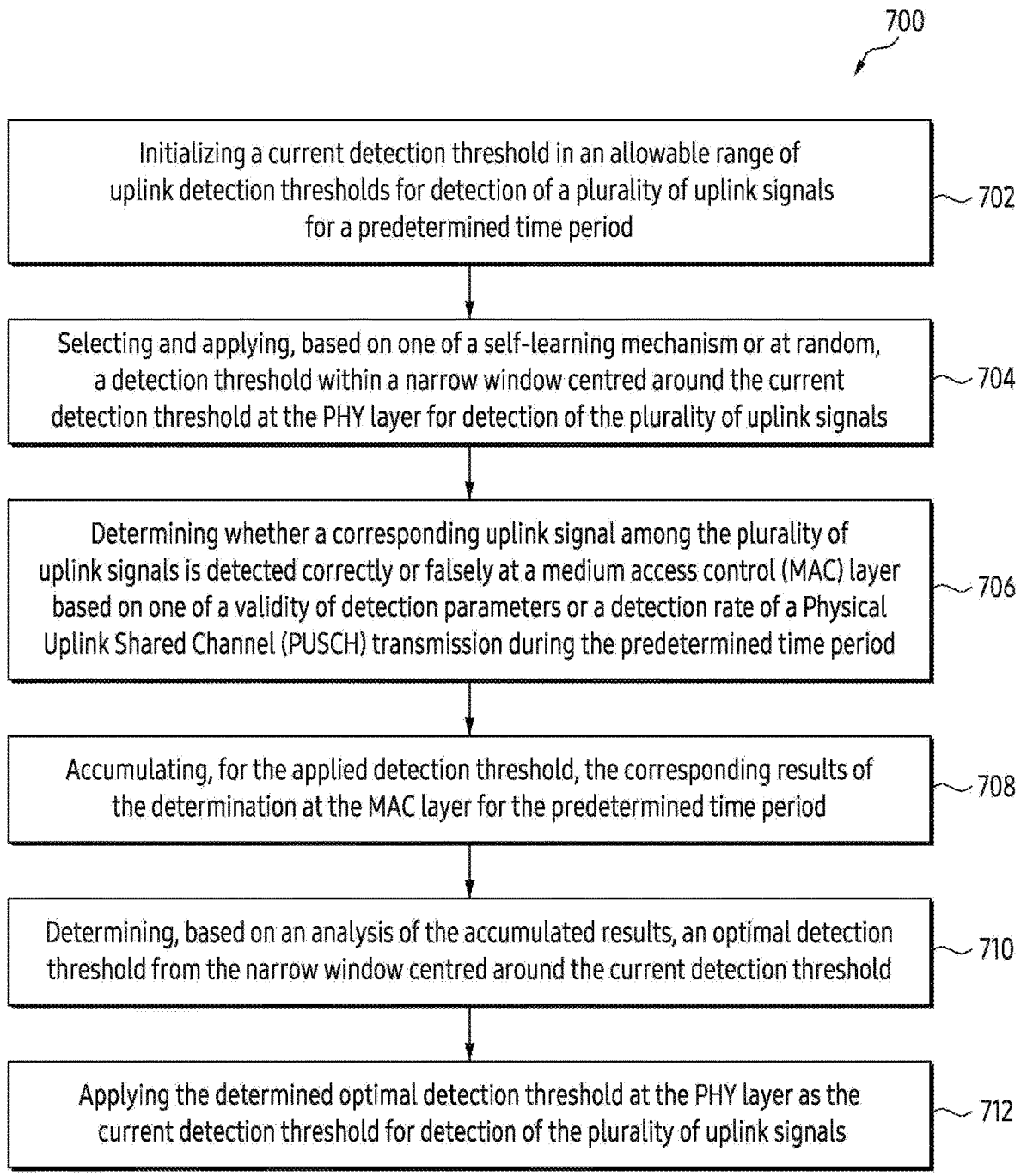
FIG. 7 is a flow chart of method operations for optimizing uplink signal detection in the wireless communication network, according to an embodiment of the disclosure.

FIG. 7 is a flow chart of method operations for optimizing uplink signal detection in the wireless communication network, according to an embodiment of the disclosure. Referring to FIG. 7, the method 700 includes a series of operations 702 to 712.

In operation 702 of the method 700, the processor 602 is configured to initialize a current detection threshold ($\lambda_{Curr}$) in an allowable range of uplink detection thresholds for the detection of a plurality of uplink signals (UL signals) for a predetermined time period. Here, the current detection threshold corresponds to one of a threshold for detection of energy of the plurality of uplink signals or a threshold for detecting a timing offset, without any deviation from the scope of the disclosure.

Figure 8:
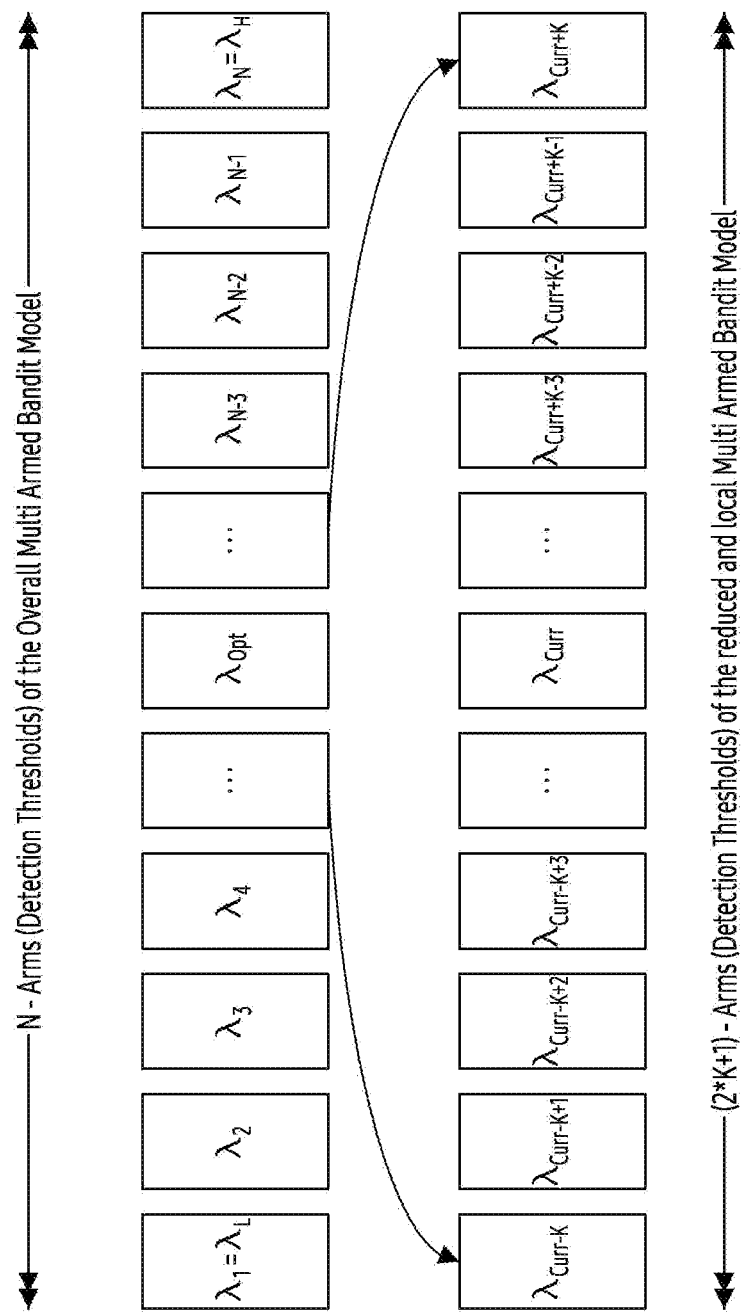
FIG. 8 depicts an example representation of the current detection threshold and the selected detection thresholds on the basis of a reduced and localized MAB model, according to an embodiment of the disclosure.

In operation 704 of the method 700, the processor 602 is further configured to select and apply, based on one of a self-learning mechanism or at random, a detection threshold within a narrow window centered around the current detection threshold at the PHY layer for detection of the plurality of uplink signals. As an example, at the PHY layer, the processor 602 follows a reinforcement learning based approach or random approach for selecting and applying the detection threshold within the narrow window centered around the current detection threshold. In particular, at the start of the measurement period, the processor selects, based on a localized multi-armed bandit (MAB) model, (2*K+1) arms as the detection thresholds that are selected, centered around $\lambda_{Curr}$. FIG. 8 depicts an example representation of the current detection threshold and the selected detection thresholds on the basis of a reduced and localized MAB model, according to another embodiment of the disclosure.

In some embodiments, the processor 602 may also relax the current detection threshold ($\lambda_{Curr}$) periodically at the PHY layer to a minimum allowable limit during the predetermined time period. The purpose of relaxing the thresholds is to allow maximum detection for configurable intervals in a periodic or event-triggered manner to assess the quality of the current detection performance of the base station.

In operation 706 of the method 700, the processor 602 is further configured to determine whether a corresponding uplink signal among the plurality of uplink signals is detected correctly or falsely at the MAC layer based on one of a validity of detection parameters or a detection rate of the PUSCH transmission during the predetermined time period. The results of the scheduled UE response received at the MAC layer after processing a detected uplink signal can be used to judge whether the detected signal was a false detection. Also, the results of the scheduled UE response received at the MAC layer after processing a detected uplink signal with relaxed threshold conditions at the PHY layer can be used to judge whether the detected signal was a missed detection with the current detection threshold. As an example, in the case of PRACH for contention-free random access (CFRA), the detection parameters correspond to the dedicated preamble ID and synchronization signal block (SSB) index. Further, in the case of SR, the detection parameters are based on whether the SR detected matches a UE that is configured with dedicated PUCCH. Therefore, the processor 602 may validate at least one of the detection parameters and the detection rate during the predetermined time period and determine whether the corresponding uplink signals are detected correctly or falsely at the MAC layer based on the validation. Particularly, the MAC layer (L2) has additional information regarding a particular PRACH/SR, whether it was invalid/false based on the detection parameters as well as the status of the response for PRACH (MSG3) and SR (PUSCH). It is to be noted that an unallocated PRACH or SR can be judged as false detection. Thus, cross-layer feedback can be used to optimize the PHY (L1) detection thresholds (energy/timing offset/advance, etc.).

Further, in operation 708 of the method 700, the processor 602 is configured to accumulate, for the applied detection threshold, the corresponding results of the determination at the MAC layer (of operation 706) for the predetermined time period.

Further, in operation 710 of the method 700, based on an analysis of the accumulated results, the processor 602 is configured to determine an optimal detection threshold from the narrow window centered around the current detection threshold. For the analysis of the accumulated results, the processor 602 firstly, determines, after processing the detection of the plurality of uplink signals at the MAC layer, a set of uplink signals among the plurality of uplink signals that are unallocated uplink signals from the accumulated results. Secondly, the processor 602 classifies the determined unallocated uplink signals as falsely detected uplink signals, and thereafter determines a requirement of the adjustment of the optimal detection threshold in case a false detection rate of detecting the uplink signals is greater than a predefined threshold value.

In some embodiments, the processor 602 may also assess, based on the accumulated results, the quality of performance of the optimal detection threshold for the detection of the plurality of uplink signals, Accordingly, the processor 602 may adjust the current detection threshold based on the assessed quality of the performance.

Further, in operation 712, after determining the optimal detection threshold, the processor 602 is configured to apply the determined optimal detection threshold at the PHY layer as the current detection threshold for the detection of the plurality of uplink signals. The optimal detection threshold is applied at the PHY layer based on a detection rate of detecting the plurality of uplink signals is poor in case the periodically relaxed current detection threshold is used, and a result of the analysis that indicates a radio calibration is required at the MAC layer.

In some embodiments, the processor 602 may also transmit, in a case where the detection rate at the MAC layer is consistently low for multiple decision periods, a message signal indicating a request for checking the status of radio statistics to an operations administration and maintenance (OAM) module of the wireless communication system.

Now an example illustrating the method 700 will be explained in accordance with FIG. 8, in accordance with the aforementioned embodiment of the disclosure.

According to the example embodiment in accordance with FIG. 8, initially, the processor 602 identifies an optimal operating threshold range ($\lambda_L, \lambda_H$) for calculating the thresholds for the base station H/W, by fixing a maximum allowable missed detection ($\lambda_H$) and a maximum allowable false alarm ($\lambda_L$). Thereafter, the processor 602 divided the optimal operating threshold range ($\lambda_L, \lambda_H$) into equally spaced N-arms of the MAB model i.e., $-[\lambda_1=\lambda_L, \lambda_2, \lambda_3, \ldots, \lambda_{N-2}, \lambda_{N-1}, \lambda_N=\lambda_H]$ of which the arm which yields the best reward is selected. The best arm in this scenario is the one that minimizes the false detection without compromising on the detection performance. Referring to FIG. 8, an N MAB problem is reduced to a (2*K+1) MAB problem with K arms selected on either side of the current best arm ($\lambda_{curr}$) in use, for continuous operation, reduced processing, and smooth transition of the detection performance. Whenever the processor 602 detects an uplink signal successfully with the help of the optimized detection threshold, it receives a reward a and whenever it performs a false detection of the uplink signal, it receives a regret of value β.

The total reward for each K arm is a weighted sum of the rewards or regrets for each outcome of the detection of the uplink signals processed at the MAC layer. In particular, for the $i^{th}$ arm, the reward to the processor 602 after T trials can be given by Equation 1 mentioned below:

$$R(i) = \Sigma_{t=1}^{t=T} \gamma^{T-t} * \Sigma_{c=1}^{c=C} (\alpha + \pi(Success|t,c) - \beta * \pi(False|t,c))$$

Equation 1

Where,

T is the number of detection opportunities in the measurement period,

C is the number of UL detections in the detection opportunity, $\pi(\text{Event}|t,c)=1$, if the judgment of $C_{th}$ uplink signal detection at the MAC layer matches and event at time t.

Further, the processor 602 updates the $\lambda_{Curr}$ with the best K arm identified as mentioned below in Equation 2:

$$\lambda Curr = \underset{i=1,\ldots,2*K+1}{\operatorname{argmax}} R(i), \quad \text{Equation 2}$$

Those skilled in the art will appreciate that the reinforcement learning approach followed by the processor using the MAB model as described herein in this disclosure may be carried out using other learning models in other specific ways than those set forth herein.

In one or more embodiments, successful detection ($\alpha > \beta$) is more prioritized over avoiding false detection. Further, the processor 602 may also determine the missed detection-false alarm trade-off based on the ratio $\alpha/\beta$ (i.e., detection rate). The processor 602 may also utilize a forgetting factor, $\gamma(0<<\gamma<=1)$ to prioritize the outcomes of the detection process. Also, if in a case the number of detections is not sufficiently high enough for the MAB model to converge, the current measurement is discarded by the processor 602 and the entire detection process is performed again with a higher value K arm.

Now an example description will be made for explaining the method operations of FIG. 7 in detail using FIG. 9 of the drawings.

Figure 9:
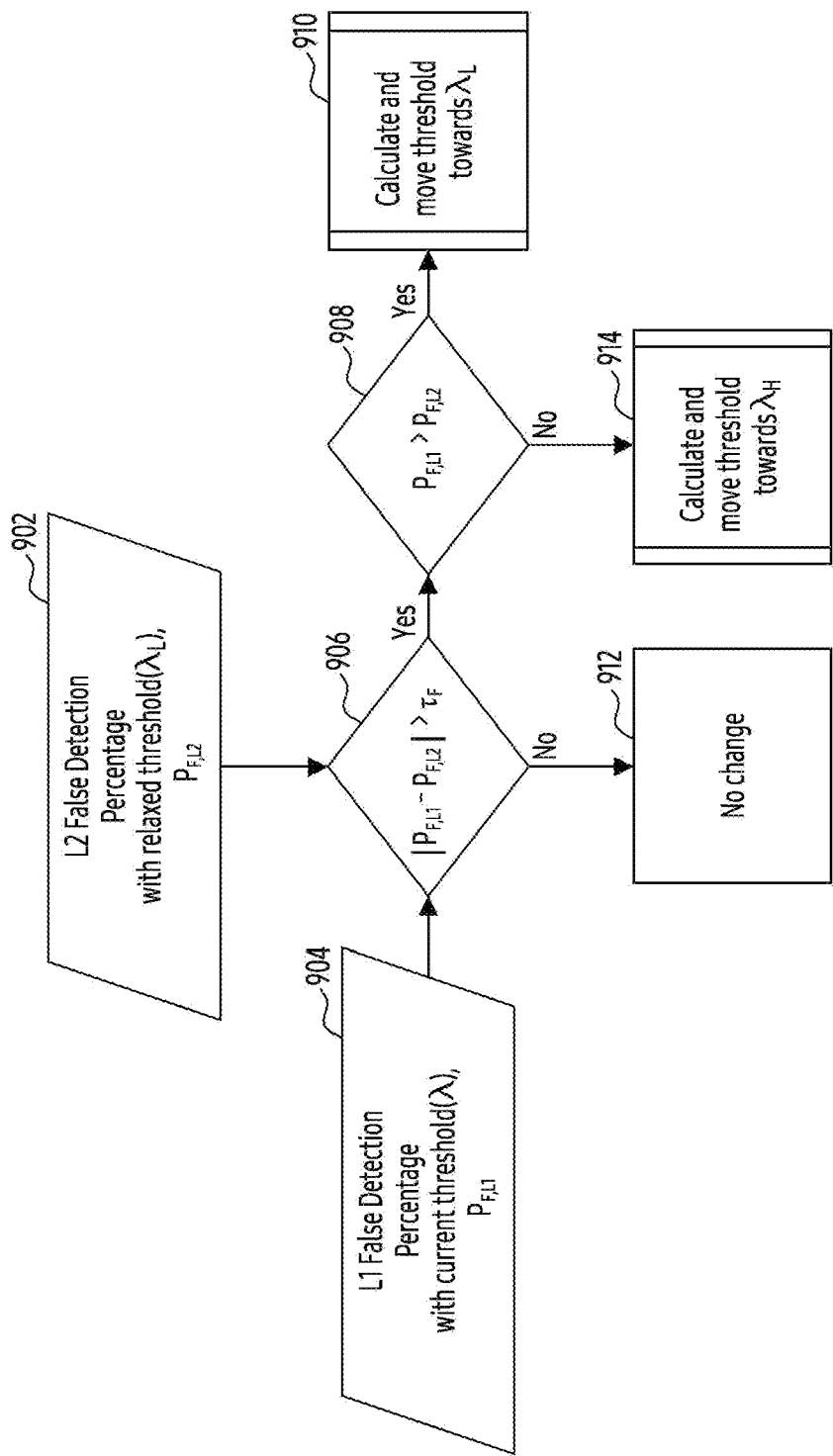
FIG. 9 illustrates a detailed flow diagram of the method operations for adjusting a value of the current detection threshold based on a detection rate of the plurality of uplink signals at the MAC layer and the PHY layer, according to an embodiment of the disclosure.

FIG. 9 illustrates a detailed flow diagram representing the method 900 operations for adjusting a value of the current detection threshold based on a detection rate of the plurality of uplink signals at the MAC layer and the PHY layer according to an embodiment of the disclosure. The method 900 includes a series of operations 902 through 914.

The functionalities and the operation which are similar to that of the operations of the method 700 as described above are omitted herein for the sake of simplicity and brevity.

In operation 902, the processor 602 is configured to calculate a detection rate ($P_F$, $L_2$) of detecting the plurality of uplink signals falsely at the MAC layer based on the detection threshold ($\lambda_L$) that is relaxed to a maximum allowable limit during the predetermined time period.

In operation 904, the processor 602 is configured to calculate a detection rate ($P_F$, $L_1$) of detecting the plurality of uplink signals falsely at the PHY layer based on the initialized threshold (i.e., the current detection threshold).

In operations 906 and 908, the processor 602 is further configured to compare the calculated detection rate at the MAC layer with the calculated detection rate at the PHY layer for the predetermined time period. In particular, in operation 906, the processor 602 determines whether an absolute difference between the calculated false detection rates at the MAC layer and the calculated false detection rate at the PHY layer is greater than a predefined threshold value. Further, in operation 908, the processor 602 determines whether the calculated false detection rate at the MAC layer is less than the calculated false detection rate at the PHY layer. The predefined threshold value can be given by $\tau=\alpha*P_{FA, L1}, \ldots$ (3), where $0<\alpha<1$, so that threshold change is executed only when there is a significant degradation assessed in detection performance.

When the result of the determination at operation 906 is no, i.e., the absolute difference between the calculated false detection rates at the MAC layer and the calculated false detection rate at the PHY layer is less than or equal to the predefined threshold value. Then, in such a case, the processor 602 is configured to maintain the current detection threshold in operation 912.

When the result of the determination at operation 906 is yes, i.e., the absolute difference between the calculated false detection rates at the MAC layer and the calculated false detection rate at the PHY layer is greater than the predefined threshold value. Also, when the result of the determination of operation 908 is Yes, i.e., it is determined that the calculated false detection rate at the MAC layer is less than the calculated false detection rate at the PHY layer. Then, in such a case, the processor 602 is configured to adjust or move a value of the current detection threshold towards $\lambda_L$ in operation 910.

Further, when the result of the determination at operation 906 indicates that the absolute difference between the calculated false detection rates at the MAC layer and the calculated false detection rate at the PHY layer is greater than the predefined threshold value, and the determination result at operation 908 indicates that the calculated false detection rate at the MAC layer is greater than the calculated false detection rate at the PHY layer. Then, in such case, the processor 602 is configured to adjust or move a value of the current detection threshold towards $\lambda_H$ in operation 914. In particular, based on the results of the comparison, the processor 602 may increase or decrease the value of the current detection threshold for improvement and enhancement in the detection rate.

Further, if at operation 906, it is determined that the absolute difference between the calculated false detection rates at the MAC layer and the calculated false detection rate at the PHY layer is less than the predefined threshold value, then a change in the current detection threshold is not required.

In one or more embodiments, if the detection rate ($P_{FA, L2}$) at the MAC layer is consistently low for multiple decision periods, the processor 602 is configured to check the status of the RADIO and transmits a message indicating the same to the OAM module. The OAM module may take further action after checking the other RADIO statistics.

According to the method and system disclosed herein, the election of the detection threshold at the PHY layer using feedback from the MAC layer can help in reducing the wastage of resources at the base station due to false detection of the uplink signals at the PHY layer. In particular, with the determined optimal thresholds, wastage of downlink/uplink resource allocation and missed scheduling opportunities in the base station (gNodeB) are reduced.

Further, in accordance with the above-described embodiments, the dynamic detection threshold calculation at the PHY layer based on feedback results of the MAC layer can help in minimizing false detection of the uplink signals. The adjustment of the detection thresholds may help in the allowance of more uplink signal detections and in recovering from any excess missed detection problems.

Further, the reduction in the false detection due to the threshold adjustment may help in bringing down computational load due to excess RAR/MSG3/SR Grant building/scheduling and hence contributes to overall downlink and uplink throughput improvement and ensures end-to-end performance improvement.

Figure 10:
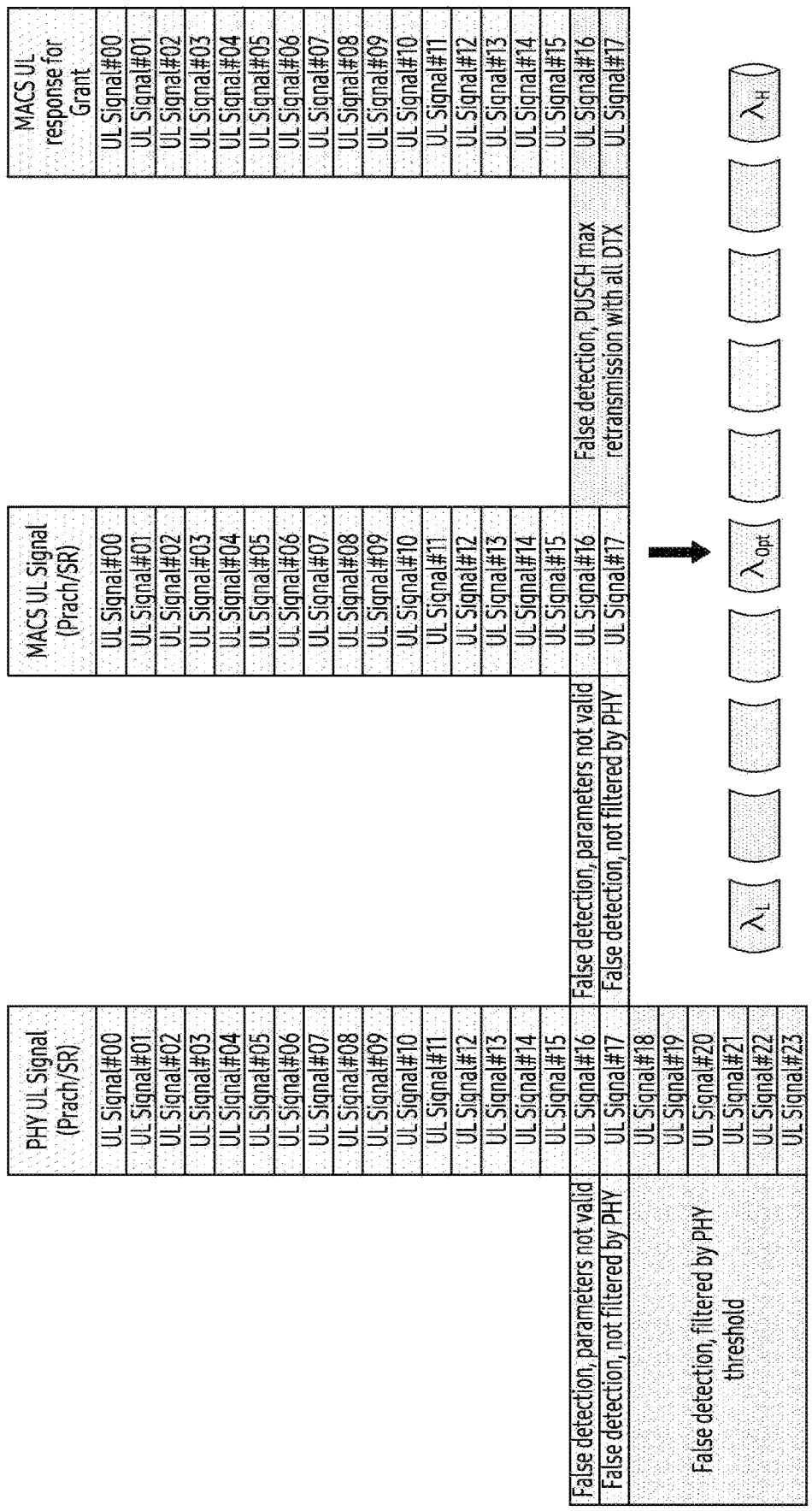
FIG. 10 illustrates an example representation of uplink signal detections using the optimal threshold, according to an embodiment of the disclosure.

FIG. 10 illustrates an example representation of uplink signals detection using the optimal threshold is shown in FIG. 10 of the drawings, according to an embodiment of the disclosure. It can be seen in FIG. 10 that when the detection threshold is optimal, a minimal amount false alarm is allowed in the system to minimize the missed detection. This ensures that the missed detection is minimal without excess resources and processing power wastage due to false alarms. Also, the false detection is low with no missed detection in this case.

Figure 11:
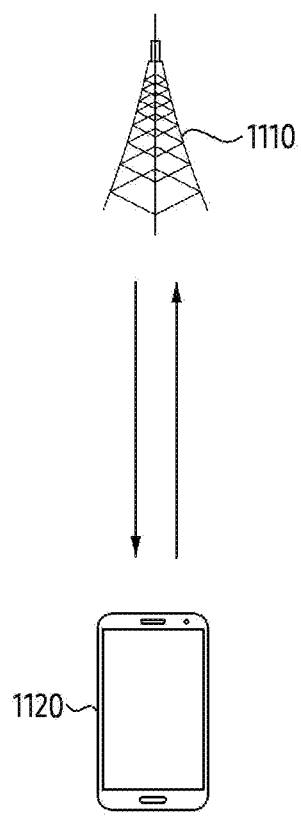
FIG. 11 illustrates a wireless communication system according to an embodiment of the disclosure.

FIG. 11 illustrates a wireless communication system according to an embodiment of the disclosure.

Referring to FIG. 11, it illustrates a base station 1110 and a terminal 1120 as parts of nodes using a wireless channel in a wireless communication system. Although FIG. 11 illustrates only one base station, the wireless communication system may further include another base station that is the same as or similar to the base station 1110.

The base station 1110 is a network infrastructure that provides wireless access to the terminal 1120. The base station 1110 may have a coverage defined based on a distance capable of transmitting a signal. In addition to the term 'base station', the base station 1110 may be referred to as 'access point (AP)', 'eNodeB (eNB)', '5th generation node', generation 'next nodeB (gNB)', 'wireless point', 'transmission/reception', or other terms having the same or equivalent meaning thereto.

The terminal 1120, which is a device used by a user, performs communications with the base station 1110 through a wireless channel. A link from the base station 1110 to the terminal 1120 is referred to as a downlink (DL), and a link from the terminal 1120 to the base station 1110 is referred to as an uplink (UL). Further, although not shown in FIG. 11, the terminal 1120 and other terminals may perform communications with each other through the wireless channel. In this context, a link between the terminal 1120 and another terminals (device-to-device link, D2D) is referred to as a side link, and the side link may be used mixed with a PC5 interface. In some other embodiments of the disclosure, the terminal 1120 may be operated without any user's involvement. According to an embodiment of the disclosure, the terminal 1120 is a device that performs machine-type communication (MTC) and may not be carried by a user. In addition, according to an embodiment of the disclosure, the terminal 1120 may be a narrowband (NB)-Internet of things (IoT) device.

The terminal 1120 may be referred to as 'user equipment (UE), 'customer premises equipment (CPE), 'mobile station', 'subscriber station', 'remote terminal', 'wireless terminal', 'electronic device', 'user device', or any other term having the same or equivalent technical meaning thereto.

The base station 1110 may perform beamforming with the terminal 1120. The base station 1110 and the terminal 1120 may transmit and receive radio signals in a relatively low frequency band (e.g., FR 1 (frequency range 1) of NR). Further, the base station 1110 and the terminal 1120 may transmit and receive radio signals in a relatively high frequency band (e.g., FR 2 of NR (or FR 2-1, FR 2-2, FR 2-3), FR 3, or millimeter wave (mmWave) bands (e.g., 28 GHz, 30 GHz, 38 GHz, 60 GHz)). In order to improve the channel gain, the base station 1110 and the terminal 1120 may perform beamforming. In this context, the beamforming may include transmission beamforming and reception beamforming. The base station 1110 and the terminal 1120 may assign directionality to a transmission signal or a reception signal. To that end, the base station 1110 and the terminal 1120 may select serving beams through a beam search or beam management procedure. After the serving beams are selected, subsequent communication may be performed through a resource having a quasi-co located (QCL) relationship with a resource that has transmitted the serving beams.

A first antenna port and a second antenna port may be evaluated to be in such a QCL relationship, if the wide-scale characteristics of a channel carrying symbols on the first antenna port can be estimated from a channel carrying symbols on the second antenna port. For example, the wide-scale characteristics may include at least one of delay spread, Doppler spread, Doppler shift, average gain, average delay, and spatial receiver parameters.

Although in FIG. 11, both the base station 1110 and the terminal 1120 are described as performing beamforming, embodiments of the disclosure are not necessarily limited thereto. In some embodiments of the disclosure, the terminal may or may not perform beamforming. Likewise, the base station may or may not perform beamforming. That is to say, only either one of the base station and the terminal may perform beamforming, or both the base station and the terminal may not perform beamforming.

In the disclosure, a beam means a spatial flow of a signal in a radio channel, and may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE, such as a CSI-RS resource, an SRS-resource, or the like may be used, and the configuration may include information associated with a beam. Beam-associated information may refer to whether a corresponding configuration (e.g., CSI-RS resource) uses the same spatial domain filter as other configuration (e.g., another CSI-RS resource within the same CSI-RS resource set) or uses a different spatial domain filter, or with which reference signal is QCL, or if QCLed, what type (e.g., QCL type A, B, C, or D) it has.

According to the related art, in a communication system with a relatively large cell radius of a base station, each base station was installed so that the respective base station includes functions of a digital processing unit (or distributed unit (DU)) and a radio frequency (RF) processing unit (or radio unit (RU)). However, as high-frequency bands are used in 4th generation (4G) systems and/or its subsequent communication systems (e.g., fifth-generation (5G), and the cell coverage of a base station decreased, the number of base stations to cover a certain area has increased. Thus, it led to more increased burden of initial installation costs for communication providers to install more base stations. In order to reduce the installation costs of the base station, a structure has been proposed in which the DU and the RU of the base station are separated so that one or more RUs are connected to one DU through a wired network and one or more RUs geographically distributed are arranged to cover a specific area.

For example, a method of optimizing uplink signal detection in a communication network comprises initializing a current detection threshold in an allowable range of uplink detection thresholds for detection of a plurality of uplink signals for a predetermined time period.

For example, the method comprises selecting and applying, based on one of a self-learning mechanism or at random, a detection threshold within a narrow window centered around the current detection threshold at a physical (PHY) layer for detection of the plurality of uplink signals.

For example, the method comprises determining whether a corresponding uplink signal among the plurality of uplink signals is detected correctly or falsely at a medium access control (MAC) layer based on one of a validity of detection parameters or a detection rate of a physical uplink shared channel (PUSCH) transmission during the predetermined time period.

For example, the method comprises accumulating, for the applied detection threshold, the corresponding results of the determination at the MAC layer for the predetermined time period.

For example, the method comprises determining, based on an analysis of the accumulated results, an optimal detection threshold from the narrow window centered around the current detection threshold.

For example, the method comprises applying the determined optimal detection threshold at the PHY layer as the current detection threshold for the detection of the plurality of uplink signals.

For example, the method comprises assessing, based on the accumulated results, a quality of performance of the optimal detection threshold for the detection of the plurality of uplink signals.

For example, the method comprises adjusting the current detection threshold based on the assessed quality of the performance.

For example, the method comprises validating at least one of the detection parameters and the detection rate during the predetermined time period.

For example, the method comprises determining whether a corresponding uplink signal among the plurality of uplink signals is detected correctly or falsely at the MAC layer based on the validation.

For example, the current detection threshold corresponds to one of a threshold for detection of energy of the plurality of uplink signals or a threshold for detecting a timing offset.

For example, the analysis of the accumulated results comprises determining, after processing of the detection of the plurality of uplink signals at the MAC layer, a set of uplink signals among the plurality of uplink signals that are unallocated uplink signals from the accumulated results.

For example, the analysis of the accumulated results comprises classifying the determined unallocated uplink signals as falsely detected uplink signals, and For example, the analysis of the accumulated results comprises determining a requirement of an adjustment of the optimal detection threshold in case if a false detection rate of detecting the uplink signals is greater than a predefined threshold value.

For example, the method comprises periodically relaxing the current detection threshold at the PHY layer to a minimum allowable limit during the predetermined time period.

For example, the optimal detection threshold is applied at the PHY layer based on a detection rate of detecting the plurality of uplink signals is poor in case the periodically relaxed current detection threshold is used, and a result of the analysis that indicates a radio calibration is required at the MAC layer.

For example, the method comprises transmitting, in a case where the detection rate at the MAC layer is consistently low for multiple decision periods, a message signal indicating a request for checking a status of radio statistics to an operations administration and maintenance (OAM) module.

For example, the method comprises calculating a detection rate of detecting the plurality of uplink signals falsely at the MAC layer based on a detection threshold that is relaxed to a maximum allowable limit during the predetermined time period.

For example, the method comprises calculating a detection rate of detecting the plurality of uplink signals falsely at the PHY layer based on the initialized threshold.

For example, the method comprises comparing the calculated detection rate at the MAC layer with the calculated detection rate at the PHY layer for the predetermined time period.

For example, the method comprises adjusting a value of the current detection threshold based on a result of the comparison.

For example, the method comprises decreasing the value of the current detection threshold when the calculated false detection rate at the MAC layer is less than the calculated false detection rate at the PHY layer, and a result of the comparison indicates that indicates an absolute difference between the calculated false detection rates at the MAC layer and the calculated false detection rate at the PHY layer is greater than a predefined threshold value.

For example, the method comprises increasing the value of the current detection threshold when the calculated false detection rate at the MAC layer is greater than the calculated false detection rate at the PHY layer, and a result of the comparison indicates that indicates an absolute difference between the calculated false detection rates at the MAC layer and the calculated false detection rate at the PHY layer is greater than a predefined threshold value.

For example, the method comprises identifying an optimal operating threshold range for calculating the thresholds for a base station of the communication network, by fixing a maximum allowable missed detection and a maximum allowable false alarm.

For example, the method comprises dividing the optimal operating threshold range into a number N of equally spaced arms of a localized multi-armed bandit (MAB) model.

For example, the method comprises selecting an arm which minimizes false detections while maintaining detection performance.

For example, the method comprises adjusting the optimal operating threshold range selecting a number K arms on either side of a current best arm in use.

For example, a system for optimizing uplink signal detection in a communication network, comprises at least one processor, and a memory configured to store instructions.

For example, the instructions, when executed by the at least one processor, configure the system to initialize a current detection threshold in an allowable range of uplink detection thresholds for detection of a plurality of uplink signals at a physical (PHY) layer for a predetermined time period.

For example, the instructions, when executed by the at least one processor, configure the system to select and apply, based on one of a self-learning mechanism or at random, a detection threshold within a narrow window centered around the current detection threshold at the PHY layer for detection of the plurality of uplink signals.

For example, the instructions, when executed by the at least one processor, configure the system to determine whether a corresponding uplink signal among the plurality of uplink signals is detected correctly or falsely at a medium access control (MAC) layer based on one of a validity of detection parameters or a detection rate of a physical uplink shared channel (PUSCH) transmission during the predetermined time period.

For example, the instructions, when executed by the at least one processor, configure the system to accumulate, for the applied detection threshold, corresponding results of the determination at the MAC layer for the predetermined time period.

For example, the instructions, when executed by the at least one processor, configure the system to determine, based on an analysis of the accumulated results, an optimal detection threshold from the narrow window centered around the current detection threshold.

For example, the instructions, when executed by the at least one processor, configure the system to apply the determined optimal detection threshold at the PHY layer as the current detection threshold for the detection of the plurality of uplink signals.

For example, the at least one processor configures the system to assess, based on the accumulated results, a quality of performance of the determined optimal detection threshold for the detection of the plurality of uplink signals.

For example, the at least one processor configures the system to adjust the current detection threshold based on the assessed quality of the performance.

For example, the at least one processor configures the system to validate at least one of the detection parameters and the detection rate during the predetermined time period.

For example, the at least one processor configures the system to determine whether a corresponding uplink signal among the plurality of uplink signals is detected correctly or falsely at the MAC layer based on the validation.

For example, the current detection threshold corresponds to one of a threshold for detection of energy of the plurality of uplink signals or a threshold for detecting a timing offset.

For example, for analyzing the accumulated results, the at least one processor configures the system to determine, after processing of the detection of the plurality of uplink signals at the MAC layer, a set of uplink signals among the plurality of uplink signals that are unallocated uplink signals from the accumulated results.

For example, the at least one processor configures the system to classify the determined unallocated uplink signals as falsely detected uplink signals.

For example, the at least one processor configures the system to determine a requirement of an adjustment of the determined optimal detection threshold in case if a false detection rate of detecting the uplink signals is greater than a predefined threshold value.

For example, the at least one processor configures the system to periodically relax the current detection threshold at the PHY layer to a minimum allowable limit during the predetermined time period.

For example, the determined optimal detection threshold is applied at the PHY layer based on a detection rate of detecting the plurality of uplink signals is poor in case the periodically relaxed current detection threshold is used, and a result of the analysis that indicates a radio calibration is required at the MAC layer.

For example, the at least one processor configures the system to transmit, in a case where the detection rate at the MAC layer is consistently low for multiple decision periods, a message signal indicating a request for checking a status of radio statistics to an operations administration and maintenance (OAM) module.

For example, the at least one processor configures the system to calculate a detection rate of detecting the plurality of uplink signals falsely at the MAC layer based on a detection threshold that is relaxed to a maximum allowable limit during the predetermined time period.

For example, the at least one processor configures the system to calculate a detection rate of detecting the plurality of uplink signals falsely at the PHY layer based on the initialized threshold.

For example, the at least one processor configures the system to compare the calculated detection rate at the MAC layer with the calculated detection rate at the PHY layer for the predetermined time period.

For example, the at least one processor configures the system to adjust a value of the current detection threshold based on a result of the comparison.

For example, the at least one processor configures the system to decrease the value of the current detection threshold when the calculated false detection rate at the MAC layer is less than the calculated false detection rate at the PHY layer, and a result of the comparison indicates that indicates an absolute difference between the calculated false detection rates at the MAC layer and the calculated false detection rate at the PHY layer is greater than a predefined threshold value.

For example, the at least one processor configures the system to increase the value of the current detection threshold when the calculated false detection rate at the MAC layer is greater than the calculated false detection rate at the PHY layer, and a result of the comparison indicates that indicates an absolute difference between the calculated false detection rates at the MAC layer and the calculated false detection rate at the PHY layer is greater than a predefined threshold value.

For example, a method of detecting an uplink signal in a communication network, comprises setting a current detection threshold in an allowable range of uplink detection thresholds for detection of a plurality of uplink signals for a predetermined time period.

For example, the method comprises identifying a plurality of candidate detection thresholds in a predetermined window centered around the current detection threshold at a first layer for detection of the plurality of uplink signals.

For example, the method comprises identifying an optimal detection threshold among the plurality of candidate detection threshold based on identifying whether the plurality of uplink signals are detected correctly at a second layer.

For example, the method comprises applying the optimal detection threshold at the first layer as the current detection threshold for the detection of the plurality of uplink signals.

For example, the method comprises identifying a quality of performance of the optimal detection threshold for the detection of the plurality of uplink signals.

For example, the method comprises adjusting the current detection threshold based on the identified quality of the performance.

For example, the method comprises identifying at least one of the detection parameters and the detection rate during the predetermined time period.

For example, the method comprises identifying whether the plurality of uplink signals are detected correctly at the second layer.

For example, the current detection threshold corresponds to one of a threshold for detection of energy of the plurality of uplink signals or a threshold for detecting a timing offset.

For example, the method comprises periodically relaxing the current detection threshold at the first layer to a minimum allowable limit during the predetermined time period.

For example, the method comprises identifying, after processing of the detection of the plurality of uplink signals at the second layer, a set of uplink signals among the plurality of uplink signals that are unallocated uplink signals.

For example, the method comprises identifying the unallocated uplink signals as falsely detected uplink signals.

For example, the method comprises identifying a requirement of an adjustment of the optimal detection threshold in case if a false detection rate of detecting the uplink signals is greater than a predefined threshold value.

For example, the method comprises identifying an optimal operating threshold range for calculating the thresholds for a base station of the communication network, by fixing a maximum allowable missed detection and a maximum allowable false alarm.

For example, the method comprises dividing the optimal operating threshold range into a number N of equally spaced arms of a localized multi-armed bandit (MAB) model.

For example, the method comprises selecting an arm which minimizes false detections while maintaining detection performance.

For example, the method comprises adjusting the optimal operating threshold range selecting a number K arms on either side of a current best arm in use.

For example, the first layer comprises a physical (PHY) layer.

For example, the method comprises the second layer comprises a medium access control (MAC) layer.

For example, an electronic device of a base station, comprises a transceiver and a processor coupled to the transceiver.

For example, the processor is configured to set a current detection threshold in an allowable range of uplink detection thresholds for detection of a plurality of uplink signals for a predetermined time period.

For example, the processor is configured to identify a plurality of candidate detection thresholds in a predetermined window centered around the current detection threshold at a first layer for detection of the plurality of uplink signals.

For example, the processor is configured to identify an optimal detection threshold among the plurality of candidate detection threshold based on identifying whether the plurality of uplink signals are detected correctly at a second layer.

For example, the processor is configured to apply the optimal detection threshold at the first layer as the current detection threshold for the detection of the plurality of uplink signals.

For example, the processor is configured to identify a quality of performance of the optimal detection threshold for the detection of the plurality of uplink signals.

For example, the processor is configured to adjust the current detection threshold based on the identified quality of the performance.

For example, the processor is configured to identify at least one of the detection parameters and the detection rate during the predetermined time period.

For example, the processor is configured to identify whether the plurality of uplink signals are detected correctly at the second layer.

For example, the current detection threshold corresponds to one of a threshold for detection of energy of the plurality of uplink signals or a threshold for detecting a timing offset.

For example, the processor is configured to periodically relax the current detection threshold at the first layer to a minimum allowable limit during the predetermined time period.

For example, the processor is configured to identify, after processing of the detection of the plurality of uplink signals at the second layer, a set of uplink signals among the plurality of uplink signals that are unallocated uplink signals.

For example, the processor is configured to identify the unallocated uplink signals as falsely detected uplink signals; and For example, the processor is configured to identify a requirement of an adjustment of the optimal detection threshold in case if a false detection rate of detecting the uplink signals is greater than a predefined threshold value.

For example, the processor is configured to identify an optimal operating threshold range for calculating the thresholds for a base station of the communication network, by fixing a maximum allowable missed detection and a maximum allowable false alarm.

For example, the processor is configured to divide the optimal operating threshold range into a number N of equally spaced arms of a localized multi-armed bandit (MAB) model.

For example, the processor is configured to select an arm which minimizes false detections while maintaining detection performance.

For example, the processor is configured to adjust the optimal operating threshold range selecting a number K arms on either side of a current best arm in use.

For example, the first layer comprises a physical (PHY) layer.

For example, the second layer comprises a medium access control (MAC) layer.

The method and system of the disclosure apply to all the network elements including the base stations of next-generation cellular systems to be deployed at higher bands.

In a hardware configuration, the method and the communication system according to the embodiments of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

In a firmware or software configuration, the method and the communication according to the embodiments of the disclosure may be implemented in the form of modules, procedures, functions, etc. performing the above-described functions or operations. Instructions may be stored in a memory unit and executed by a processor. The memory unit may be located at the interior or exterior of the processor and may transmit and receive data to and from the processor via various known means.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Those skilled in the art will appreciate that the operations described herein in the disclosure may be carried out in other specific ways than those set forth herein without departing from essential characteristics of the disclosure. The above-described embodiments are therefore to be construed in all aspects as illustrative and not restrictive. The scope of the disclosure should be determined by the appended claims, not by the above description, and all changes coming within the meaning of the appended claims are intended to be embraced therein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

For one or more embodiments, at least one of the components set forth in one or more of the preceding figures may be configured to perform one or more operations, techniques, processes, and/or methods as set forth herein. For example, a processor (e.g., baseband processor) as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The methods according to various embodiments described in the claims and/or the specification of the disclosure may be implemented in hardware, software, or a combination of hardware and software.

When implemented by software, a computer-readable storage medium storing one or more programs (software modules) may be provided. One or more programs stored in such a computer-readable storage medium (e.g., non-transitory storage medium) are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that can be accessed via a communication network, such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in a singular or plural form according to a proposed specific embodiment. However, such a singular or plural expression may be selected appropriately for the presented context for the convenience of description, and the disclosure is not limited to the singular form or the plural elements. Therefore, either an element expressed in the plural form may be formed of a singular element, or an element expressed in the singular form may be formed of plural elements.

Meanwhile, specific embodiments have been described in the detailed description of the disclosure, but it goes without saying that various modifications are possible without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of detecting an uplink signal in a communication network, the method comprising:
    setting a current detection threshold in a designated range of uplink detection thresholds for detection of a plurality of uplink signals for a predetermined time period;
    identifying a plurality of candidate detection thresholds in a predetermined window centered around the current detection threshold at a first layer for detection of the plurality of uplink signals;
    identifying, based on a detection threshold which is a minimum limit in the designated range, a first detection rate of detecting the plurality of uplink signals falsely at a second layer;
    identifying, based on the current detection threshold, a second detection rate of detecting the plurality of uplink signals falsely at the first layer;
    identifying, based on the first detection rate and the second detection rate, an optimal detection threshold among the plurality of candidate detection threshold; and
    applying the optimal detection threshold at the first layer as the current detection threshold for the detection of the plurality of uplink signals,
    wherein the first layer comprises a physical (PHY) layer, and
    wherein the second layer comprises a medium access control (MAC) layer.

2. The method of claim 1, further comprising:
    identifying a quality of performance of the optimal detection threshold for the detection of the plurality of uplink signals; and adjusting the current detection threshold based on the identified quality of the performance.

3. The method of claim 1, further comprising:
identifying at least one of detection parameters or a detection rate during the predetermined time period; and
identifying whether the plurality of uplink signals are detected correctly at the second layer.

4. The method of claim 1, wherein the current detection threshold corresponds to one of a threshold for detection of energy of the plurality of uplink signals or a threshold for detecting a timing offset.

5. The method of claim 1, further comprising:
identifying, after processing of the detection of the plurality of uplink signals at the second layer, a set of uplink signals among the plurality of uplink signals that are unallocated uplink signals;
identifying the unallocated uplink signals as falsely detected uplink signals; and
identifying a requirement of an adjustment of the optimal detection threshold in case if the first false detection rate is greater than a predefined threshold value.

6. The method of claim 5, further comprising:
identifying an optimal operating threshold range for calculating thresholds for a base station of the communication network, by fixing a maximum allowable missed detection and a maximum allowable false alarm.

7. The method of claim 6, further comprising:
dividing the optimal operating threshold range into a number N of equally spaced arms of a localized multi-armed bandit (MAB) model, and
selecting an arm which minimizes false detections while maintaining detection performance.

8. The method of claim 7, further comprising:
adjusting the optimal operating threshold range based on selecting a number K of arms on either side of a current best arm in use.

9. An electronic device of a base station in a communication network, comprising:
a transceiver;
memory, including one or more storage media, storing instructions; and
at least one processor including processing circuitry,
wherein the instructions, when executed by the at least one processor, cause the electronic device to:
set a current detection threshold in a designated range of uplink detection thresholds for detection of a plurality of uplink signals for a predetermined time period,
identify a plurality of candidate detection thresholds in a predetermined window centered around the current detection threshold at a first layer for detection of the plurality of uplink signals,
identify, based on a detection threshold which is a minimum limit in the designated range, a first detection rate of detecting the plurality of uplink signals falsely at a second layer,
identify, based on the current detection threshold, a second detection rate of detecting the plurality of uplink signals falsely at the first layer,
identify, based on the first detection rate and the second detection rate, an optimal detection threshold among the plurality of candidate detection threshold; and apply the optimal detection threshold at the first layer as the current detection threshold for the detection of the plurality of uplink signals,
wherein the first layer comprises a physical (PHY) layer, and
wherein the second layer comprises a medium access control (MAC) layer.

10. The electronic device of claim 9, wherein the instructions, when executed by the at least one processor, cause the electronic device to:
identify a quality of performance of the optimal detection threshold for the detection of the plurality of uplink signals; and
adjust the current detection threshold based on the identified quality of the performance.

11. The electronic device of claim 9, wherein the instructions, when executed by the at least one processor, cause the electronic device to:
identify at least one of detection parameters or a detection rate during the predetermined time period; and
identify whether the plurality of uplink signals are detected correctly at the second layer.

12. The electronic device of claim 9, wherein the current detection threshold corresponds to one of a threshold for detection of energy of the plurality of uplink signals or a threshold for detecting a timing offset.

13. The electronic device of claim 9, wherein the instructions, when executed by the at least one processor, cause the electronic device to:
identify, after processing of the detection of the plurality of uplink signals at the second layer, a set of uplink signals among the plurality of uplink signals that are unallocated uplink signals;
identify the unallocated uplink signals as falsely detected uplink signals; and
identify a requirement of an adjustment of the optimal detection threshold in case if a false detection rate of detecting the uplink signals is greater than a predefined threshold value.

14. The electronic device of claim 13, wherein the instructions, when executed by the at least one processor, cause the electronic device to:
identify an optimal operating threshold range for calculating thresholds for the base station of the communication network, by fixing a maximum allowable missed detection and a maximum allowable false alarm.

15. The electronic device of claim 14, wherein the instructions, when executed by the at least one processor, cause the electronic device to:
divide the optimal operating threshold range into a number N of equally spaced arms of a localized multi-armed bandit (MAB) model, and
select an arm which minimizes false detections while maintaining detection performance.

16. The electronic device of claim 15, wherein the instructions, when executed by the at least one processor, cause the electronic device to:
adjust the optimal operating threshold range based on selecting a number K of arms on either side of a current best arm in use.

* * * * *